(12) United States Patent
Hummelshøj

(10) Patent No.: US 11,003,916 B2
(45) Date of Patent: May 11, 2021

(54) SYSTEMS AND METHODS FOR OBJECT HISTORICAL ASSOCIATION

(71) Applicant: Toyota Research Institute, Inc., Los Altos, CA (US)

(72) Inventor: Jens Strabo Hummelshøj, Burlingame, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 168 days.

(21) Appl. No.: 15/803,143

(22) Filed: Nov. 3, 2017

(65) Prior Publication Data

US 2019/0138817 A1 May 9, 2019

(51) Int. Cl.
| G06T 7/246 | (2017.01) |
| H04N 5/225 | (2006.01) |
| G06K 9/00 | (2006.01) |
| G06F 16/58 | (2019.01) |

(52) U.S. Cl.
CPC ......... *G06K 9/00771* (2013.01); *G06F 16/58* (2019.01); *G06K 9/00335* (2013.01); *G06K 9/00536* (2013.01); *G06K 9/00671* (2013.01); *G06T 7/248* (2017.01)

(58) Field of Classification Search
CPC .................. G06K 9/00335; G06K 9/00536
See application file for complete search history.

(56) References Cited

U.S. PATENT DOCUMENTS

| 6,107,918 A | 8/2000 | Klein et al. |
| 6,226,396 B1 | 5/2001 | Marugame |
| 6,445,409 B1 | 9/2002 | Ito et al. |
| 7,099,510 B2* | 8/2006 | Jones ............... G06K 9/00248 348/142 |
| 7,227,893 B1* | 6/2007 | Srinivasa ........... G06K 9/00771 348/155 |
| 7,367,497 B1 | 5/2008 | Hill |
| 7,415,212 B2* | 8/2008 | Matsushita ............. G06F 3/002 250/206.1 |
| 7,720,652 B2 | 5/2010 | Toyama et al. |
| 7,979,355 B2 | 7/2011 | Shah et al. |
| 8,224,029 B2* | 7/2012 | Saptharishi ........ G06K 9/00718 382/103 |

(Continued)

OTHER PUBLICATIONS

Toyohisa Nakada, Hideaki Kanai, and Susumu Kunifuji. 2005. A support system for finding lost objects using spotlight. In Proceedings of the 7th international conference on Human computer interaction with mobile devices & services (MobileHCI '05). (Year: 2005).*

(Continued)

*Primary Examiner* — Gandhi Thirugnanam
(74) *Attorney, Agent, or Firm* — Christopher G. Darrow; Darrow Mustafa PC

(57) ABSTRACT

Embodiments described herein disclose methods and systems for dynamic object recognition. Using location and information from the recognition process, historical data for a dynamic object, and associated data from secondary objects, a more complete data set can be generated for the dynamic object. The dynamic object data set can then be stored for later recognition and a more complete and human-like understanding of the dynamic object, useful in a variety of automated tasks.

20 Claims, 4 Drawing Sheets

(56) References Cited

U.S. PATENT DOCUMENTS

| | | | | |
|---|---|---|---|---|
| 8,526,677 | B1* | 9/2013 | Crichton | G06K 9/00691 382/103 |
| 8,649,565 | B1* | 2/2014 | Kim | G06K 9/6292 382/106 |
| 9,420,559 | B2* | 8/2016 | Bai | G01S 1/00 |
| 9,557,178 | B2 | 1/2017 | Ghose et al. | |
| 9,582,937 | B2 | 2/2017 | Anttila et al. | |
| 10,505,962 | B2* | 12/2019 | Rhee | G06F 21/55 |
| 2003/0023517 | A1* | 1/2003 | Marsh | G07F 7/08 705/28 |
| 2004/0190754 | A1* | 9/2004 | Sakagami | H04N 7/18 382/103 |
| 2005/0157908 | A1* | 7/2005 | Matsugu | G06K 9/00885 382/107 |
| 2005/0182518 | A1* | 8/2005 | Karlsson | G06K 9/6296 700/253 |
| 2005/0207622 | A1* | 9/2005 | Haupt | G06K 9/00711 382/118 |
| 2006/0062430 | A1* | 3/2006 | Vallone | H04N 7/181 382/103 |
| 2006/0093185 | A1* | 5/2006 | Kato | G06K 9/00261 382/103 |
| 2006/0262188 | A1 | 11/2006 | Elyada et al. | |
| 2007/0090973 | A1* | 4/2007 | Karlsson | G05D 1/0234 340/995.22 |
| 2007/0263900 | A1* | 11/2007 | Medasani | G06K 9/00369 382/103 |
| 2007/0269077 | A1* | 11/2007 | Neff | G01S 7/41 382/103 |
| 2008/0019567 | A1* | 1/2008 | Takagi | G06K 9/00369 382/103 |
| 2008/0033645 | A1* | 2/2008 | Levinson | G01C 21/20 701/469 |
| 2008/0169914 | A1* | 7/2008 | Albertson | B60W 50/14 340/438 |
| 2008/0170749 | A1* | 7/2008 | Albertson | G06K 9/00979 382/103 |
| 2008/0247601 | A1* | 10/2008 | Ito | G08B 13/19602 382/103 |
| 2009/0222134 | A1* | 9/2009 | Franke | G05B 19/4061 700/251 |
| 2010/0061624 | A1* | 3/2010 | Cobb | G06K 9/6215 382/157 |
| 2010/0076621 | A1* | 3/2010 | Kubotani | G08G 1/166 701/1 |
| 2012/0076361 | A1 | 3/2012 | Fujiyoshi | |
| 2012/0162254 | A1* | 6/2012 | Anderson | G06K 9/46 345/633 |
| 2017/0200061 | A1* | 7/2017 | Julian | G06K 9/00791 |
| 2017/0259814 | A1* | 9/2017 | Fujimura | G06K 9/00805 |
| 2017/0372327 | A1* | 12/2017 | Withrow | G06Q 30/0185 |
| 2018/0165518 | A1* | 6/2018 | Assaf | G06K 9/00671 |
| 2018/0215544 | A1* | 8/2018 | High | G05D 1/0088 |
| 2019/0135296 | A1* | 5/2019 | Hummelshoj | G08G 1/0104 |
| 2019/0138817 | A1* | 5/2019 | Hummelshoj | G06F 16/58 |
| 2019/0188499 | A1* | 6/2019 | Hummelshoj | G06K 9/00805 |
| 2019/0196465 | A1* | 6/2019 | Hummelshoj | B60W 60/0015 |
| 2020/0070828 | A1* | 3/2020 | Okuda | B60W 30/18 |

OTHER PUBLICATIONS

Boldt, R. (2014). The last-seen image : an image-based approach for finding lost objects using a head-mounted display. (Year: 2014).*

Butz, A., Schneider, M., and Spassova, M. SearchLight—a lightweight search function for pervasive environments. In Proc. of Pervasive Computing, 2004. 351-356 (Year: 2004).*

M. Nguyen-Hoang, T. Le, V. Ninh, Q. Che, V. Nguyen and M. Tran, "Object retrieval in past video using bag-of-words model," 2017 International Conference on Control, Automation and Information Sciences (ICCAIS), Chiang Mai, 2017, pp. 145-150, (Year: 2017).*

P. Belimpasakis, K. Roimela and Y. You, "Experience Explorer: A Life-Logging Platform Based on Mobile Context Collection," 2009 Third International Conference on Next Generation Mobile Applications, Services and Technologies, Cardiff, Wales, 2009, pp. 77-82 (Year: 2009).*

\* cited by examiner

SYSTEMS AND METHODS FOR OBJECT HISTORICAL ASSOCIATION

FIELD

The subject matter described herein generally relates to dynamic object recognition and, more particularly, association of objects to one another and the environment.

BACKGROUND

In recent years, devices which determine and recognize objects in a field of view, and which direct automated devices or vehicles in accordance with this judgment, have been proposed for the purpose of improving both quality of life and safety in a variety of fields. These devices generally use object recognition to make the above determinations and recognitions. Object recognition generally relates to finding a given object in an image or a sequence of frames in a video segment. Temporally proximate features that have high temporal correlations are identified within the sequence of frames. Each successive frame contains a temporally proximate representation of an object.

Object recognition is typically based on a model of the object at some level of abstraction. Object representations, also referred to as the "view", can change from frame to frame due to a variety of object transformations, such as rotation, movement/translation, change in lighting, background, noise, appearance of other objects, partial blocking/unblocking of the object, etc. The object representations are then compared against known models or features, to determine either the object class (e.g., automotive, footwear, etc.), object type (e.g., small economy car, running boots, etc.) or both. This model is matched to an object representation which has been abstracted to the same level as the model.

However, current methods of object recognition are limited in the information that they can provide. When a new object enters an environment, the detection is generally limited to the above object recognition, with little to no knowledge about individual objects of the same class and type, the history of the object or how the object arrived at the current position. As the inevitable goal for automated devices and cars is to perform as well or better than a qualified human operator would, information about individual objects and associations between the same are valuable.

SUMMARY

The systems and methods described herein use historical data associated with an object and a location, to determine additional information associated with the object. In one embodiment, an association system for associating objects in an environment is disclosed. The association system can include one or more processors; and a memory communicably coupled to the one or more processors. The memory can store an object recognition module including instructions that when executed by the one or more processors cause the one or more processors to obtain, using at least one image capture device, one or more images of the environment, and to recognize at least one dynamic object and one or more environmental assets in the one or more images of the environment, the environmental asset including at least one secondary object. The memory can further store an instance identification module including instructions that when executed by the one or more processors cause the one or more processors to identify the at least one dynamic object in a database of object historical information for the environment, the object historical information comprising at least one previous recognition of the at least one dynamic object. The memory can further store an association module including instructions that when executed by the one or more processors cause the one or more processors to identify, using the database of object historical information, one or more associations between the at least one previous recognition of the at least one dynamic object and the at least one secondary object, and to perform a task related to the at least one dynamic object based on the one or more associations using an automated device.

In another embodiment, a non-transitory computer-readable medium for associating objects in an environment is disclosed. The medium can store instructions that when executed by one or more processors cause the one or more processors to obtain, using at least one image capture device, one or more images of the environment. The instructions further cause the processors to recognize at least one dynamic object and one or more environmental assets in the one or more images of the environment, the environmental asset including at least one secondary object. The instructions further cause the processors to identify the at least one dynamic object in a database of object historical information for the environment, the object historical information comprising at least one previous recognition of the at least one dynamic object. The instructions further cause the processors to identify, using the database of object historical information, one or more associations between the at least one previous recognition of the at least one dynamic object and the at least one secondary object. The instructions further cause the processors to perform a task related to the at least one dynamic object based on the one or more associations using an automated device.

In another embodiment, a method for object recognition is disclosed. The method can include obtaining, using at least one image capture device, one or more images of the environment. The method can further include recognizing at least one dynamic object and one or more environmental assets in the one or more images of the environment, the environmental asset including at least one secondary object. The method can further include identifying the at least one dynamic object in a database of object historical information for the environment, the object historical information including at least one previous recognition of the at least one dynamic object. The method can further include identifying, using the database of object historical information, one or more associations between the at least one previous recognition of the at least one dynamic object and the at least one secondary object. The method can further include performing a task related to the at least one dynamic object based on the one or more associations using an automated device.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the Figures. Additionally, elements of one embodiment can be advantageously adapted for utilization in other embodiments described herein.

DETAILED DESCRIPTION

Embodiments disclosed herein describe systems and methods used to associate data with a dynamic object, a secondary object, a location or combinations thereof, to determine additional information associated with the dynamic object. The systems and methods can include one or more image capture devices (e.g., cameras) positioned, for example, in a ceiling of a room, to determine a high level view of the room. The image capture devices, in conjunction with computing devices, can be used to build historical information of what is expected in an environment. What is expected in the environment includes one or more static objects and one or more structural features. The system and methods described herein can be used to track a history of a particular area. For example, if an image capture device is located in a kitchen or a bedroom, the image capture device and computing devices can know a lot of additional information and can narrow down what an object is and what its source is (e.g., to whom the object belongs). If the image capture device observes a person taking their boots off, the boots and the person can then become new objects (e.g., a dynamic object and a secondary object, respectively) in the environment. The computing device(s) can detect who took the boots off for identification of more information related to the dynamic object (e.g., boots). As a result, processing time can be reduced, since the system is monitoring the room that the camera is in and is only looking at changes. When a change is detected in the environment (e.g., a dynamic object is introduced), the system and methods described here can detect what the dynamic object is and who introduced the object (i.e., the secondary object) based on previously known information and observations over time.

In instances where a novel dynamic object is introduced to the environment (i.e., the dynamic object has never been located in the environment before), the system and methods can be tiered to take additional analysis and processing steps. For example, where a novel dynamic object or a novel secondary object is introduced, the system and methods can run image processing algorithms to, for example, recognize the dynamic object and recognize the secondary object, and associate the dynamic object with the secondary object. However, in examples where the dynamic object or the secondary object has already been introduced to the environment, the system can recognize a specific instance of each object, and compare what is stored as object historical information for the location, with features for the dynamic object or the secondary object. Computing time can be reduced with these tiered processing steps. Elements of the embodiments disclosed herein are more clearly described with relation to the figures below.

Figure 1:
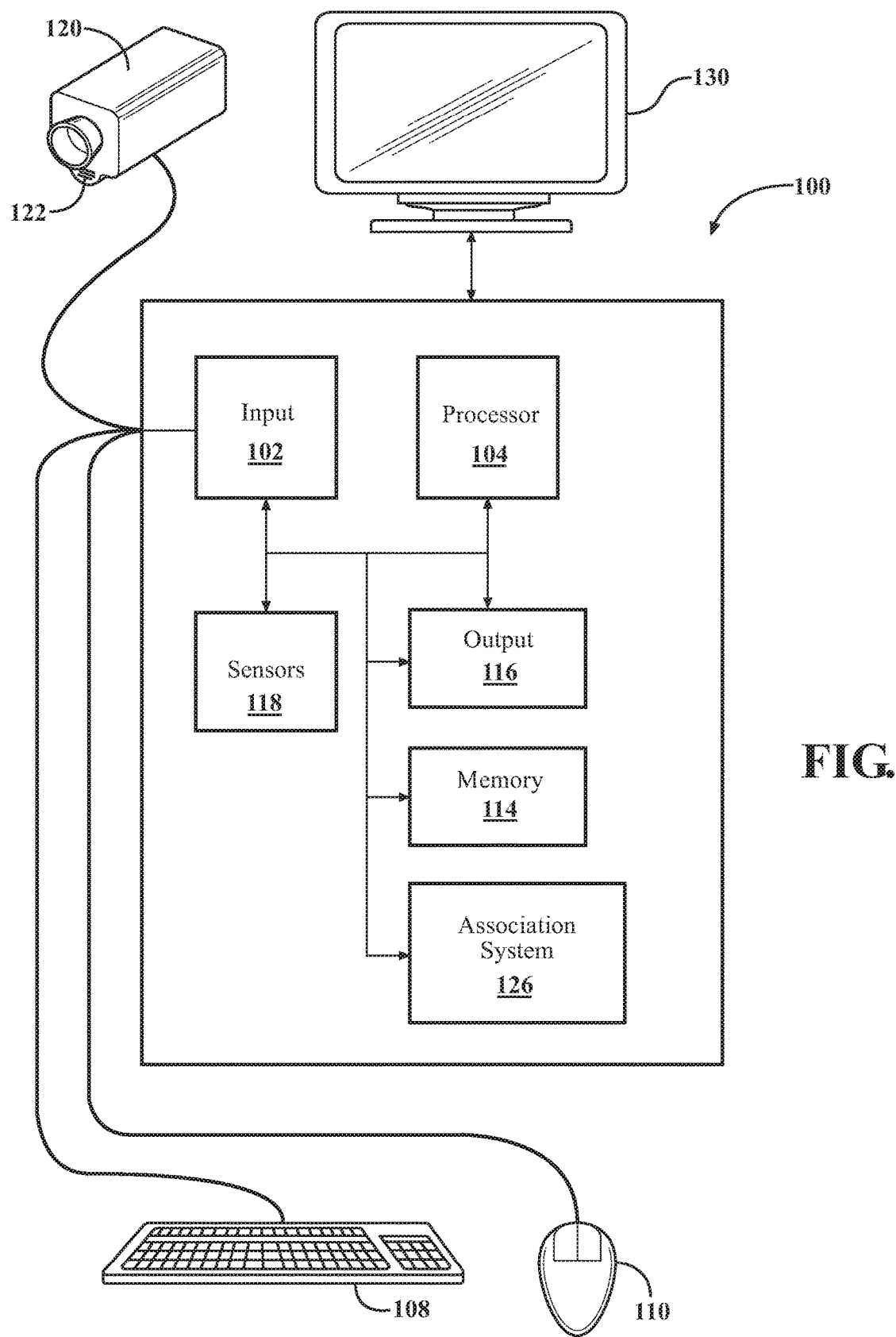
FIG. 1 is a block diagram of computing device and image capture device configured for recognizing and associating dynamic objects, according to one or more embodiments.

Referring to FIG. 1, an example of a computing device 100 is illustrated. The computing device 100, as shown in FIG. 1, can be any appropriate type of computing device such as, but not limited to, a personal computer (PC), workstation, embedded computer, or stand-alone device with a computational unit, such as a microprocessor, DSP (digital signal processor), FPGA (field programmable gate array), or ASIC (application specific integrated circuit). Shown here, the computing device 100 is a PC connected with a display device 360. While arrangements will be described herein with respect to PC computers, it will be understood that embodiments are not limited to PC computers. In some implementations, the computing device 100 can be any other form of computer device that, for example, can operate at least semi-autonomously, includes object detection or the capability to support object detection, and thus benefits from the functionality discussed herein.

The computing device 100 has an input 102 for obtaining images for analysis and final identification and/or verification. The input 102 is one or more connections, either wired or wireless, for an input device to the computing device 100. The input 102 can be any suitable communication interface depending on device type and include, but is not limited to, USB (universal serial bus), frame grabber, Ethernet, or Firewire. The computing device 100 further comprises a processor 104, such as a general purpose processor, for use in the data processing and analysis described herein. The input 102 be connected with sensors 118 (e.g., thermostat, barometer, etc.), microphones or other active or passive input devices or systems. Shown here, the input 102 is connected with a keyboard 108, a mouse 110, the sensors 118, an image capture device 120 and a microphone 122. The computing device 100 can still further comprise connection 112. The connection 112, which can be wired or wireless, can allow the computing device 100 to communicate with other computing devices, locally or remotely, such as over a network protocol (e.g., Ethernet or similar protocols).

The computing device 100 can further comprise some volatile or non-volatile memory, such as memory 114. The memory 114 can include one or more modules that include computer readable instructions that, when executed by the processor 104, cause the processor 104 to perform methods and functions that are discussed herein. The memory 114 can include a database 210, described with reference to FIG. 2. The memory 114 can contain information related to a reference material for comparison and/or analysis purposes, such as known relationships of dynamic objects and secondary objects. The computing device 100 can also include output connection 116 for conveying output in a fashion which is usable by an autonomous device or a user. In one example, the output connection 116 conveys output to a screen for convenient viewing (e.g., display device 130) or to a control device for controlling an external process wherein the dynamic objects are part thereof. Embodiments of external processes can include, but are not limited to, autonomous robotic processes, industrial production processes, security processes (e.g., detection of suspicious activity as related to people-object associations), or medical applications (e.g., association of medical devices to a procedure performed in an operating room).

The computing device further includes an association system 126 that is implemented to perform methods and other functions as disclosed herein relating to the association of dynamic objects with secondary objects and/or the environment. Dynamic objects are objects that move in the environment and are not part of the environment inventory. Dynamic objects is understood in the sense of a recognition scheme. As such, the word "objects" includes living objects such as animals and people, as well as inanimate objects such as boots or a ball. Information about the dynamic objects can include any or all information described with reference to the static objects. However, the dynamic objects will more frequently update pose information, previous pose information, changes in possession or ownership, to reflect the changing nature of dynamic objects.

Figure 2:
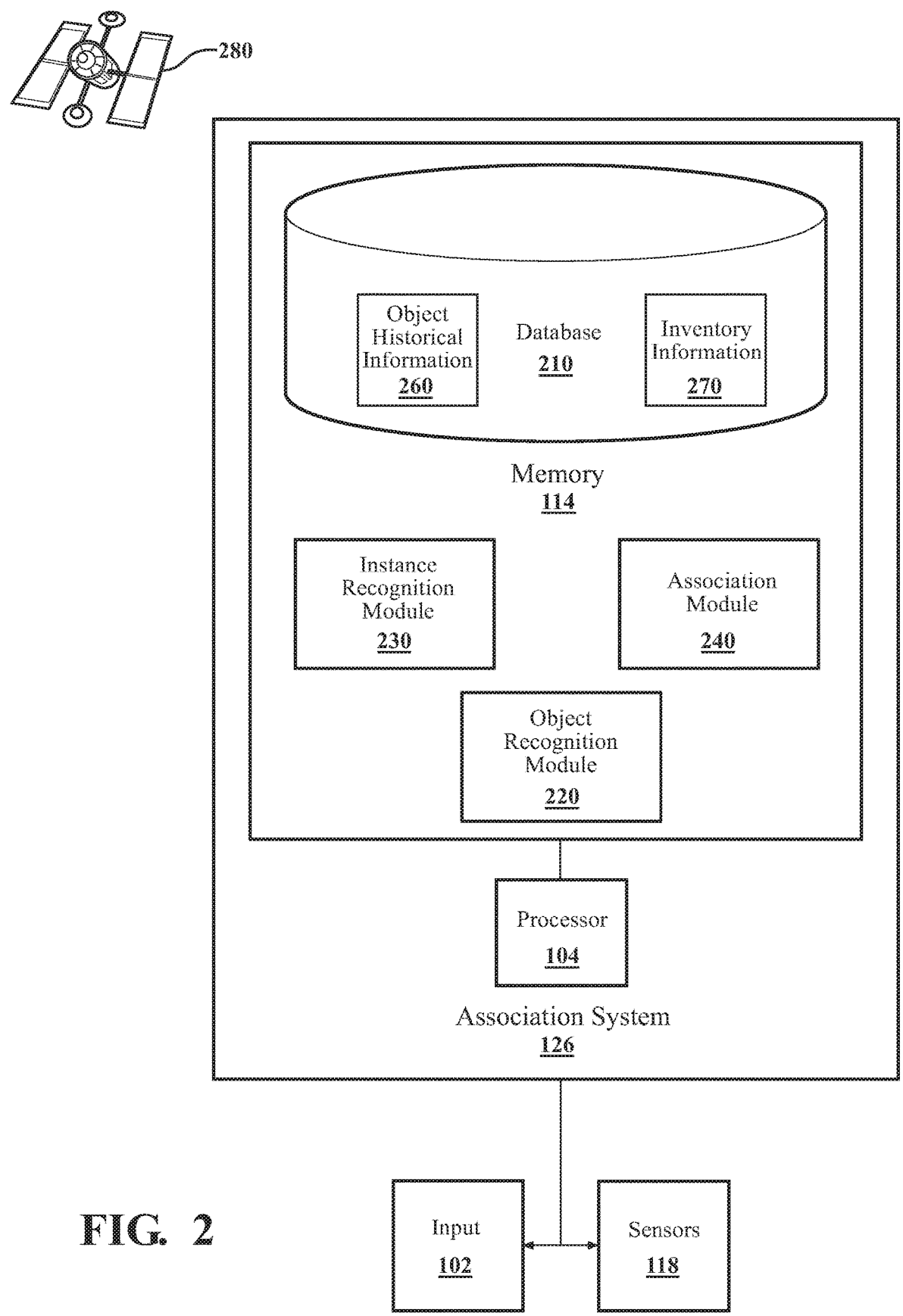
FIG. 2 is an illustration of an association system capable of recognizing and associating dynamic objects, according to one or more embodiments.

With reference to FIG. 2, one embodiment of the association system 126 of FIG. 1 is further illustrated. The association system 126 is shown as including a processor 104 from the computing device 100 of FIG. 1. Accordingly, the processor 104 can be a part of the association system 126, the association system 126 can include a separate processor from the processor 104 of the computing device 100, or the association system 126 can access the processor 104 through a data bus or another communication path. In one embodiment, the association system 126 includes the memory 114 that stores an object recognition module 220, an instance identification module 230 and an association module 240. The memory 114 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the processor 104, cause the processor 104 to perform the various functions disclosed herein.

The object recognition module 220 generally includes instructions that function to control the processor 104 to obtain one or more images of the environment using one or more sensors 118, as connected with an input 102 of the computing device 100, to recognize at least one dynamic object and one or more environmental assets in the one or more images of the environment. The object recognition module 220 can be activated by one or more initiation events, such as movement in an environment, as detected by a motion detector. Motion detectors, infrared sensors, RADAR, LIDAR, an image capture device 120 or other sensors, can be included in the sensors 118. Once initialized, the object recognition module 220, through the execution of instructions by the processor 104, collects information about one or more environmental assets in the environment for recognition. Environmental assets, as used herein, describes all objects, components of the environment, detections, associations and/or other information within or collected from the environment, including the dynamic objects, secondary objects, and static objects.

The information collected can include both environmental data and object data. Environmental data is used herein to describe elements which are static in the environment including static objects, such as couches, lamps, or other objects which do not generally change position, or only change position within a fixed path, such as a refrigerator door. Static objects are objects occur with regular frequency in the environment and are not generally mobile, including movement by a person or another actor. Static objects can contain moveable elements, such as the door of a refrigerator. The information about the static objects can include structural and positioning information, such as the pose (i.e., the position and orientation) of the object, composition, details of personal ownership, length of time in the environment date of arrival, and other location and historical information about the object. In one example, the environment is a living room and the static objects include a couch, a love seat, a chair, a rug, a lamp, a shoe rack, and a picture. The information about the static objects can further include object type information, such as manufacturer, general use, where they were purchased, purchase price, active components, weight, material and type for each of the objects, and other structural and manufacture information about the object.

Object data is used herein to describe data about dynamic objects and secondary objects. Dynamic object are mobile objects which can enter or exit the environment. The object data includes details related to both the object itself, such as structural data) and details related to the object interaction with the environment (such as pose, movement over time, relation to other objects, etc.). The object recognition module 220 can then use the object data to recognize the object class and the object type, according to an object recognition scheme. The object recognition scheme can include comparison to known pictures, formation of 3D models from the image, or others. The object data can further include data produced as part of the object recognition scheme, such as identifiers on the object, 3D models produced or others. Once the object is recognized, the recognition, the object data and the environmental data are added to the recognition data, for use in further modules of the association system 126. The recognition data can further be added to the object historical information 260.

The environmental data can further include information from or about the environment. The environmental data can include the location (e.g., the living room of a house), the environmental parameters (e.g., temperature, humidity, and other environmental factors), size and boundaries of the environment (e.g., walls, obstacles, etc.). The environmental data can also include static objects in the environment which are designed or otherwise used to interact with the dynamic object (e.g., a shoe rack for boots).

The environmental data can provide context to the location of the dynamic object, data tracking metrics, and can ultimately be used to speed up the object recognition sequence. The context for the location of the dynamic object can include likely events that led to the object being in the room (e.g., people commonly come home from work and take off their boots in the living room). Data tracking metrics can include statistical information regarding the dynamic object in the environment. By tracking the dynamic object's interaction with the environment, we can be more aware of the dynamic objects (both type and specific instance) that are likely to occur either in this particular environment or in similar environments.

After recognition, the instance identification module 230 generally includes instructions that function to control the processor 104 to identify the at least one dynamic object in a database of object historical information for the environment. The instance identification module 230 can retrieve the recognition data, produced by the object recognition module 220, and information regarding at least one previous recognition of the dynamic object from the object historical information 260 to recognize a particular dynamic object. As described here, the instance identification module 230 includes instructions to acquire the object historical information 260 from a database 210 that characterizes previously known information about a particular dynamic object. The object historical information 260 can include location historical data, object specifications, structural information, ownership, and so on. Object specifications are details, generally available from the manufacturer, describing requirements and performance details of an object. It should be appreciated that the present disclosure provides an exemplary listing of aspects associated with the dynamic object that can be monitored to produce the object historical information 260. However, this listing is not to be construed as limiting and is provided as an exemplary list of possibilities for purposes of this discussion.

In one or more embodiments, the instance identification module 230 can reference the object historical information 260 or inventory information 270 to determine redundant information in the recognition data. The object historical information 260 and inventory information 270 are referenced and the answers are forwarded to the image capture device 120. The image capture device 120 can then restrict the data collected regarding the dynamic object, to avoid redundancies. Alternatively, the recognition data can be collected as normal with redundant portions not uploaded to the computing device, or redundant data can be uploaded and used for partial updates (e.g., black boot, deteriorating color). Further, the object historical information 260 can be used to update inventory information 270, such as when new static object are established in the environment.

Though much of the above information is described objectively, subjective information can be collected about the objects. Subjective information can be both actual and hypothetical information about the objects which is based in opinion (e.g., this boot is going out of style, based on other boots seen in the environment). Verbalized opinions, likes and dislikes based on use and treatment and more can be incorporated into a dynamic object data set. In the example described above, a person can walk into the environment, sit down on the couch, take off her boots and slide them across the floor, as she verbalizes comfort from taking her boots off. In this case, both the boots and the person are dynamic objects. However, for simplicity, we can focus on the boots as the dynamic object. Information on the boots can include the color, size (either numerical or comparative to other boots), material, the general type of shoe (e.g., dress boots), brand (if available), final pose of the boots, and vector for the slide, details of the amount of force applied, the condition of the dynamic object (e.g., the boots are wet) and temporal information regarding the boots from entry to final pose.

Accordingly, by way of example, the object historical information 260 can include information about some or all available environmental assets, including object type and classification, number and timing of detections of the dynamic object, structural or body features, composition, ownership history, possession history, associated dialog used in description of the dynamic object, pose of the object, manufacture details, age, physiological parameters (if any), environment conditions, expected life time, conditions of use (e.g., raincoats in the rain), and so on. Further, the object historical information 260 can be a collection of information from a variety of sources, both local and remote to the computing device 100. The variety of sources can include the dynamic object data set (i.e., the data collected, raw or processed, by the object recognition module 220, the instance identification module 230, and the association module 240 during the current operation), a second object historical information from a second database (e.g., information gathered from another association system, similar to or the same as the one described here, for the same environment or a separate environment), publicly available information about the dynamic object or combinations thereof.

The association system 126 can further use inventory information 270 in the detection, identification, and association of dynamic objects and secondary objects. The association system 126 can use a previously acquired inventory from the inventory information 270 for the environment or the inventory can be acquired during the monitoring, using the instance identification module 230. The inventory information 270 is information regarding the environment in the absence of dynamic objects. The inventory information 270 can be used by the instance identification module 230 in characterizing specific dynamic objects. The inventory information 270 can be used by the association module 240 to form an association, such as associating a static object from the environment with the dynamic object. The inventory information 270 can further be used by the object recognition module 220 to monitor the environment, such as to differentiate between static objects and dynamic objects.

Additionally, the instance identification module 230 can determine the relation of a dynamic object to existing data in the object historical information 260 in multiple different ways depending on a particular implementation. In one embodiment, the instance identification module 230 communicates with the one or more sensors 118 discussed in connection with FIG. 1 such as the image capture device 120, heart rate monitor sensors, infrared sensors, barometers, the microphone 122, and so on. In one embodiment, the input devices are located within an enclosure of the environment, remote from the computing device 100 and can be positioned in various locations in order to acquire information about the noted aspects of the dynamic object and/or aspects related to the environment and the secondary object. Furthermore, the instance identification module 230 can include multiple redundant ones of the input devices through input 102 in order to, for example, improve accuracy/precision of the object historical information 260 as collected. As well, the instance identification module 230 can receive information from the object recognition module 220 regarding initial recognition of the dynamic object, for further identification.

With continued reference to the association system 126, in one embodiment, the association system 126 includes the database 210. The database 210 is, in one embodiment, an electronic data structure stored in the memory 114 or another data store and that is configured with routines that can be executed by the processor 104 for analyzing stored data, providing stored data, organizing stored data, and so on. Thus, in one embodiment, the database 210 stores data used by the modules 220, 230, and 240 in executing various functions. In one embodiment, the database 210 includes the object historical information 260 collected in part by the object recognition module 220 in addition to further data used by the association system 126 such as the inventory information 270. The memory 114 can be stored locally, such as in an automated device or the computing device 100. The memory 114 can further be stored remotely, such as in a cloud server.

The association module 240, in one embodiment, generally includes instructions that function to control the processor 104 to identify, using the database of object historical information 260, one or more associations between the at least one previous recognition of the at least one dynamic object and the at least one secondary object. That is, the association module 240 uses the object historical information 260 and the collected data forming the dynamic object data set from the instance identification module 230 to characterize association between the dynamic object and the environment or a secondary object of the computing device 100. In general, the object historical information 260 is a collection of historical data, either observed by the association module 240 in the past (as part of the dynamic object data set) or collected from secondary sources, representing points of association or shared data between the dynamic object and the secondary object, the environment observed by the computing device 100 or both. The association is the relationship shared between the dynamic object and a secondary object and/or the environment as determined using the object historical information 260 and the dynamic object data set. Accordingly, the association module 240 can generate the association as an assessment of amount and type of connection between secondary objects or environment, as previously detected, observed or collected by the association module 240 of the computing device 100. Types of connection include temporal connections, locality connections, use connections, or other connections which can describe the relation between two or more objects.

Thus, by way of a brief example, the association module 240 can, for example, electronically access the object historical information 260 including information about the specific dynamic object, such as the last known pose, temporal connections to other objects, locality connections to other objects or further association information. In one embodiment, the association module 240 assesses the information about the last known pose of the specific dynamic object and, more particularly, information associating the last known pose of the specific dynamic object and any secondary objects or environmental data (e.g., the person who positioned the dynamic object and how the object was positioned, any interactions between static objects in the environment that are required to stabilize the pose, etc.). From this association, the association module 240 can characterize further information about the dynamic object, such as the likely ownership of the specific dynamic object or proper location within the environment of the computing device 100. For example, the association module 240 can consider whether the pose of the specific dynamic object in the environment is consistently in the vicinity of a specific secondary object (e.g., boots which are generally tossed toward a shoe rack), whether the specific dynamic object has specific circumstances of use (e.g., an umbrella only being used in case of rain or when barometric pressure drops below a certain percentage of normal), whether the dynamic object is used by multiple secondary objects, and so on. From this assessment, the association module 240 uses the object historical information 260 to determine facts about the specific dynamic object in the environment. Thus, the object historical information 260 informs the association module 240 about the dynamic object based on current and previous pose.

In further aspects, the association module 240 can undertake a more complex analysis in order to associate multiple environmental or secondary object interactions with the dynamic object. For example, the association module 240 can correlate a pose of the dynamic object with further information from the input 102, such as a presence/location of secondary objects, and a relation of the secondary objects to dynamic objects (e.g., a coat as the dynamic object and a coat rack as the secondary object) within the environment, as detected by the instance identification module 230. In general, reference to the environment of the computing device 100 as used herein relates to information about the environment detected by the computing device 100, whether local or remote, and objects in the environment, and association of the environment to the objects and vice versa.

Additionally, the association module 240 can further consider remote data, such as remote data 280, when associating the dynamic object and the secondary object and/or the environment. In one embodiment, the remote data can include various external structural aspects related to the dynamic object and external environmental aspects relating to the detected environment. For example, the remote data can include GPS coordinates of the dynamic object, manufacturer parameters on the dynamic object (e.g., composition, weight, etc.), external events (e.g., expected time of arrival for the dynamic object changed due to a traffic accident), daily use patterns, method of movement, external temperature, GPS movement route of the dynamic object, GPS movement route for an associated secondary object, and other data collected by the instance identification module 230 from different sensors and systems of the instance identification module 230.

Thus, to form an association between objects, the association module 240, in one embodiment, analyzes the object historical information 260 along with the additional information (e.g., the dynamic object data set) to determine association between the objects (e.g., the dynamic object and the secondary object). In general, the association module 240 identifies the various data elements in relation to the dynamic object, which provides, for example, likelihoods of dynamic object ownership by/of the secondary object. Subsequently, the association module 240 can combine the individual likelihoods according to defined weightings to produce an overall likelihood. Consequently, the association module 240 can provide the overall likelihood as the association level. The association module 240 can also apply further analysis using the overall likelihood, so that the association level reflects the actual relationship between objects within the environment. The association level between objects can be determined by the computing device 100 by, for example, translating the likelihood of association into a particular classification (e.g., 0-10) according to aspects (e.g., history of use with relation to the secondary object) of the environment.

In further embodiments, such as in the case of a novel dynamic object, the association module 240 in combination with the object recognition module 220 and the instance identification module 230, form recognition data for a new entry in the object historical information 260. In this case, the object recognition module 220 collects information regarding the novel dynamic object in the environment, as previously discussed. The instance identification module 230, when implemented in one embodiment, electronically processes the existing data from the object historical information 260, the object recognition module 220 (e.g., the recognition data) and other electronic data as possible inputs to the new entry in the object historical information 260. Accordingly, the association module 240 in concert with the instance identification module 230 use the object historical information 260 and the recognition data to determine the new associations as an electronic output that characterizes an extent of association between the novel dynamic object and preexisting secondary objects.

Additionally, while the use of many different sources and forms of data are described as being part of how the association module 240 computes the association between the dynamic object and the secondary object, in various embodiments, the particular data can vary according to different aspects of the implementation. In any case, the present examples are intended for purposes of illustration and should not be construed as a limiting form of the disclosed data elements and functions. Moreover, it should be appreciated that the discussed object historical information 260 and additionally discussed electronic data can be, in one embodiment, collected and used to train the association module 240.

That is, the object historical information 260, recognition data, and other data can be collected and stored while the association module 240 is operating. Thereafter, the association system 126, in one embodiment, can communicate the collected information to a central collection point to be used in revising the association module 240. In further embodiments, the association system 126 can use the collected information as a training data set to update or otherwise customize/improve the association module 240 or the instance identification module 230 in relation to independently confirmed associations of the dynamic object within the environment observed by the computing device 100. Thus, in one embodiment, the association system 126 further trains the association module 240 using the object historical information 260 and input 102 and by providing feedback to the association module 240 or the instance identification module 230 according to logged responses of a local operator and/or logged confirmed associations computed by the association module 240. In this way, the association system 126 can actively learn which associations correctly reflect actual associations and thus, adjust the modules accordingly.

The association system 126, through the association module 240, can then perform a task related to the dynamic object, based on the one or more associations, using an automated device. Here, the association module can include instructions that function to control the processor 104 to perform a task related to the association. The task can be performed through the use of an automated device. An automated device is any device which can provide an automated response or action in response to one or more commands. Automated devices can include robotic devices, sufficiently automated household appliances, computing devices, phones, PDAs, autonomous vehicles or others. The task can be visual, such as providing instructions to a display indicating the location of the dynamic object (e.g., the boots) to the secondary object (e.g., the person). In another embodiment, the task can be physical, such as sending instructions to an autonomous robot, based on the association, to make the autonomous robot move the dynamic object (e.g., the boots) with relation to the secondary object (e.g., to the person). In another embodiment, the association module 240 can perform a task with relation to multiple associations. In one example, the boots are associated with the person, and the person is associated with the shoe rack. The association module 240 can then provide instructions to the automated device to move the boots to the person's shoe rack. One skilled in the art will understand the variety of tasks and associations which can be made using the above described system. Further tasks and associations are contemplated without explicit recitation herein.

In a further embodiment, the association system 126, through the association module 240, can create a temporal pattern using the object historical information. The temporal pattern can be used to respond to a future event. In one example, a person is the dynamic object and a vase, a static object is the secondary object. Using the elements of the modules above, the object recognition module 220 recognizes the secondary object and the dynamic object, the instance identification module 230 associates the secondary object and the dynamic object with their respective information in the object historical information 260 and the association module 240 forms an association between the secondary object and the dynamic object. Using the information about the association from the association module 240, the association system 126 can then anticipate a future event. In one example, the system detects that flowers have been purchased through a bank debit in an online checking account. The association system 126 then reviews possible associations for related information, connecting the information that the secondary object above, the vase, is used for maintaining flowers and can be filled with water for said purpose. Using this connected information, the association system 126 instructs an automated device, such as a robot, to fill the secondary object with water.

Figure 3:
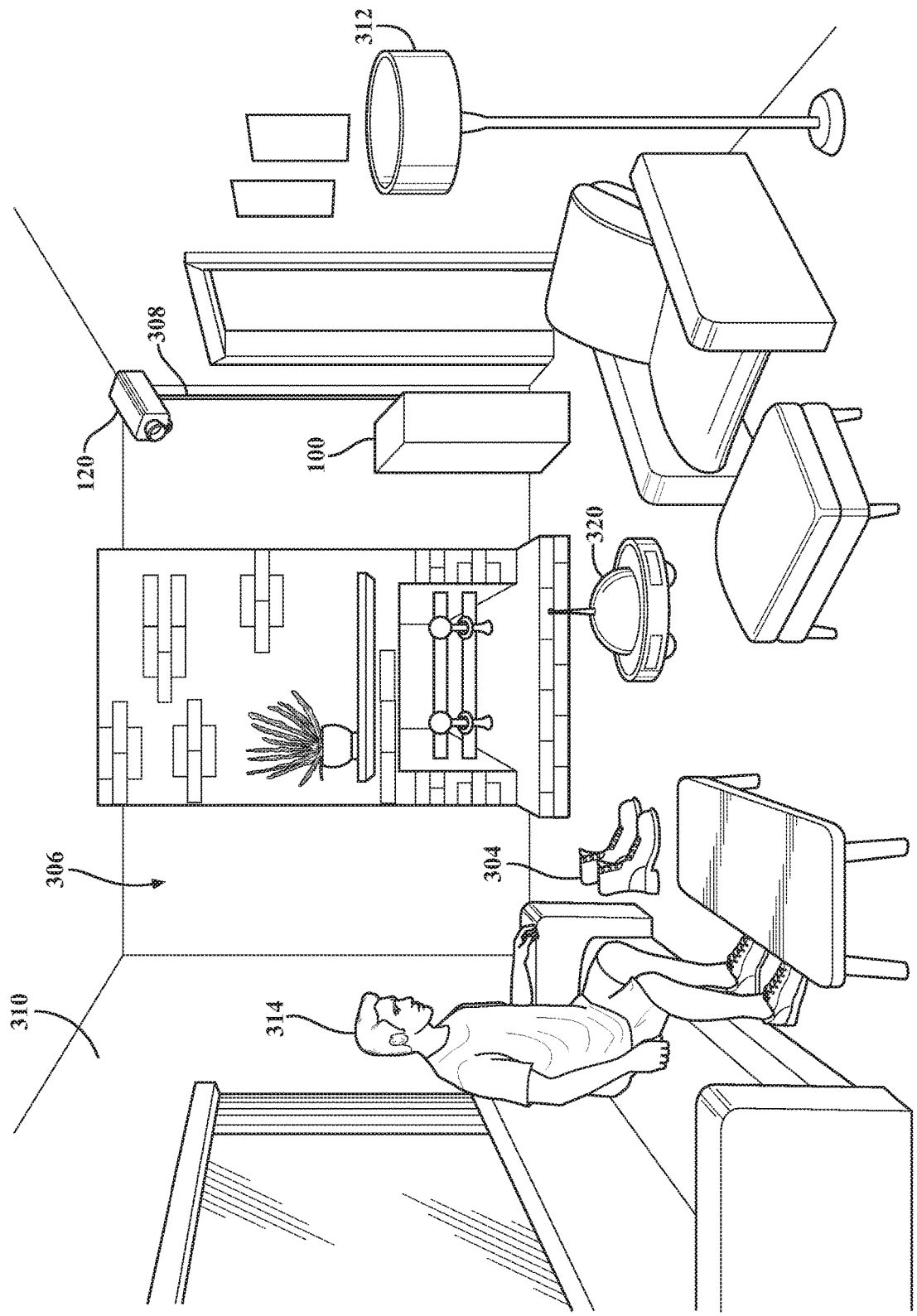
FIG. 3 is an illustration of an association system implemented in an environment, according to one embodiment.

In one embodiment of the present disclosure, an association system 126 is used as part of an environment for obtaining images, analyzing for dynamic objects, associating secondary objects and responding to results from the identification and/or verification process, as can be seen in FIG. 3. As such, the association system 126 can include at least one image capture device 120 or any other device or unit for obtaining a representation of a dynamic object, such as boots 304, and a secondary object, such as a person 314, in an environment 306, a computing device 100, and responsive equipment, such as the autonomous robotics or industrial process equipment described below.

The environment 306, as exemplified in FIG. 3, includes environmental assets, such as the enclosure 310 and the static objects 312. The enclosure 310 is a possible component of the environment. In this example, a living room of a house is used, the enclosure being measured by the boundaries of the walls of the living room. The static object 312 is exemplified by a lamp in the environment 306. Further static objects in the environment include the couch, the tables, and all other objects in this depiction which generally remain static in the environment. However, neither the enclosure 310 nor the static object 312, as depicted here, are necessary for an environment 306. The at least one image capture device 120 is used for acquiring one or more images of the boots 304 (the dynamic object, which are owned by the person 314) and the person 314 (which, in this example, is a secondary object) in the environment 306. The images are then transferred to the computing device 100 for analysis and verification and/or identification by the association system 126 and/or the object recognition module 220.

The association system 126 can be configured to run instructions to perform the methods described below in FIG. 4. The resulting recognition data, association data, and historical data from this process can then be added to the dynamic object data set. The dynamic object data set can be transmitted to a database and added to the object historical information, transmitted to a control system (e.g., a robotic control system) or transmitted to a display device. In the case of object recognition, at least one image of the boots 304 (i.e., the dynamic object) is obtained, and the image or images are transmitted to the computing device 100, using any suitable communication technology 308 (wired or wireless) The acquired image or images can then be analyzed and compared with data obtained from reference measurements, for example with known 2D-3D relationships. However, comparison can be made between an inferred 3D shape with a stored 3D reference data or between a 2D surface model with a stored 2D reference surface model. The result can be made available through, for instance, the display device 130, an exemplary illustration of which is shown in FIG. 1. It should be appreciated by those skilled in the art that the image capture device and/or display/control system can be incorporated with the computing device forming an integral unit and that the result can be displayed in any suitable manner and is not limited to the above described example. Instead of transferring the result to a display device 130 it can be simply stored in a database, integrated into computing device 100, or used in any suitable control process for controlling e.g., a robot, an entrance system, an alarm, and so on.

Shown here, the person 314 enters the environment 306, sits down and takes off the boots 304. The motion of the dynamic objects (e.g., the boots 304 and the person 314) can then activate the association system 126, which can start the object recognition module 220. The object recognition module 220, through instructions executed by the processor 104, collects environmental data using the image capture device 120. The object recognition module 220, using the above environmental data, can recognize the boots 304 and the person 314 as dynamic objects. As stated previously, objects can be both dynamic objects and secondary objects, as described herein. The boots 304 and the person 314 can initially be recognized as dynamic objects, before a determination of association occurs (in this case, assigning each dynamic object as a secondary object to the other). The environmental data can include static objects from the environment 306, including the walls of the enclosure 310, the lamp 312, and other immobile objects within the environment 306.

The recognition data, including the object data (e.g., recognized dynamic objects, such as the boots 304 and the person 314) and the environmental data, can then be forwarded to the instance identification module 230. The instance identification module 230 can then, through instructions executed by the processor 104, reference object historical information from a database, such as the object historical information 260 from the database 210. The object historical information can contain information regarding every entrance into the environment 306, from the day the person 314 purchased the boots 304. Noting the history of the person 314 and the boots 304 in the environment 306, and recognition details previously collected in light of current recognition data, the instance identification module 230 recognizes both the specific person which corresponds to the person 314 and the specific boots which correspond to the boots 304.

Each are then indexed using the same indicators as their respective file within the object historical information 260. As the boots 304 are the focus of this portion of the discussion, the boots 304 can then be classified as the dynamic object and the person 314 can be classified as the secondary object for the association. However, it is understood that, in operation both the person 314 and the boots 304 would be both dynamic objects and secondary objects with respect to one another. Using the referenced information and the detection data, instance data is created regarding the person 314 and the boots 304. Instance data is data related to the individual objects, collected or processed by the instance identification module 230, which can be associated into the object historical information 260 as related to the specific object instance.

The recognition data and the instance data are then forwarded to the association module 240. The association module 240 includes instructions, that when executed by the one or more processors, cause the one or more processors to form an association with between the dynamic object and the environmental assets, such as the secondary object, wherein the association creates association data which provides further information about the dynamic object. Using the object historical information 260, the recognition data and the instance data, the person 314 is associated to the boots 304. The instance data provides specific indicators about the boots 304 and the person 314, which are used with the object historical information to collect all instances in which the boots 304 and the person 314 have entered the environment. Instances can include the boots 304 entering the environment 306 without the person 314 (e.g., someone borrowed the boots 304 and then returned them). As well, instances can include the person 314 entering the environment 306 without the boots (e.g., the person 314 wore a different pair of boots). The accumulated instances and the associations between those instances, formed by the association module, can be referred to as the associated data. The association data can provide information a wide variety of information, such as temporal data, common poses and locations in the environment, common interactions with the dynamic object, and others related to the interactions of the dynamic object and the environmental assets. In this example, the associated data can provide information about the proper location of the boots 304 in the environment 306.

In the example above, the boots, as the dynamic object, can be associated with the person, the secondary object. The additional information associated with the boots can include the person's build, clothing or attire, the connection of the boots as a piece of the person's attire, and the time she entered the environment. Further historical, locational or temporal information about the interaction of the person and the boots can be included, such as the content of the person's comments and the general emotion conveyed (e.g., relief).

The association system 126 can further include an automated device, such as an autonomous robot 320. The autonomous robot 320 can have the ability grab an object, move freely within a room or other capabilities typical of robotic devices. The autonomous robot 320 can receive communications from the computing device 100, through the association system 126, to perform a task related to the dynamic object based on the one or more associations. In this example, the communication includes guidance regarding the proper location of the boots 304. In one embodiment, the autonomous robot 320 is designed to collect boots and return them to their owner. The autonomous robot 320 can have historical information regarding where each person stores their boots. The computing device 100 can then provide the dynamic object data set to the autonomous robot 320, which can include the pose of the boots 304 and the association to the person 314. The autonomous robot 320 can then use this information to collect the boots and locate them in the proper storage location.

In a further embodiment, the autonomous robot 320 can include either the computing device 100, the image capture device 120, or combinations thereof. In one embodiment, the computing device 100 is incorporated into the autonomous robot 320. In this embodiment, the autonomous robot 320 receives transmitted data from the image capture device 120, which is analyzed and processed to create recognition data, the association data and the historical data for the dynamic object data set, as described above. In one example, the computing device 100 and the image capture device 120 are incorporated into the autonomous robot 320. In this embodiment, the autonomous robot 320 receives data through an integrated version of the image capture device 120, which is analyzed and processed to create recognition data, the association data and the historical data for the dynamic object data set, as described above. In another embodiment, the autonomous robot 320 is guided by the computing device 300. In this embodiment, the autonomous robot 320 is autonomous only based on the remote instructions received from the computing device 100. Here, the autonomous robot 320 receives transmitted instructions for movement and action from the computing device 100, based on the dynamic object data set. Other and further combinations between the autonomous robot 320, the computing device 100 and the image capture device 120, are contemplated without explicit recitation thereof.

Figure 4:
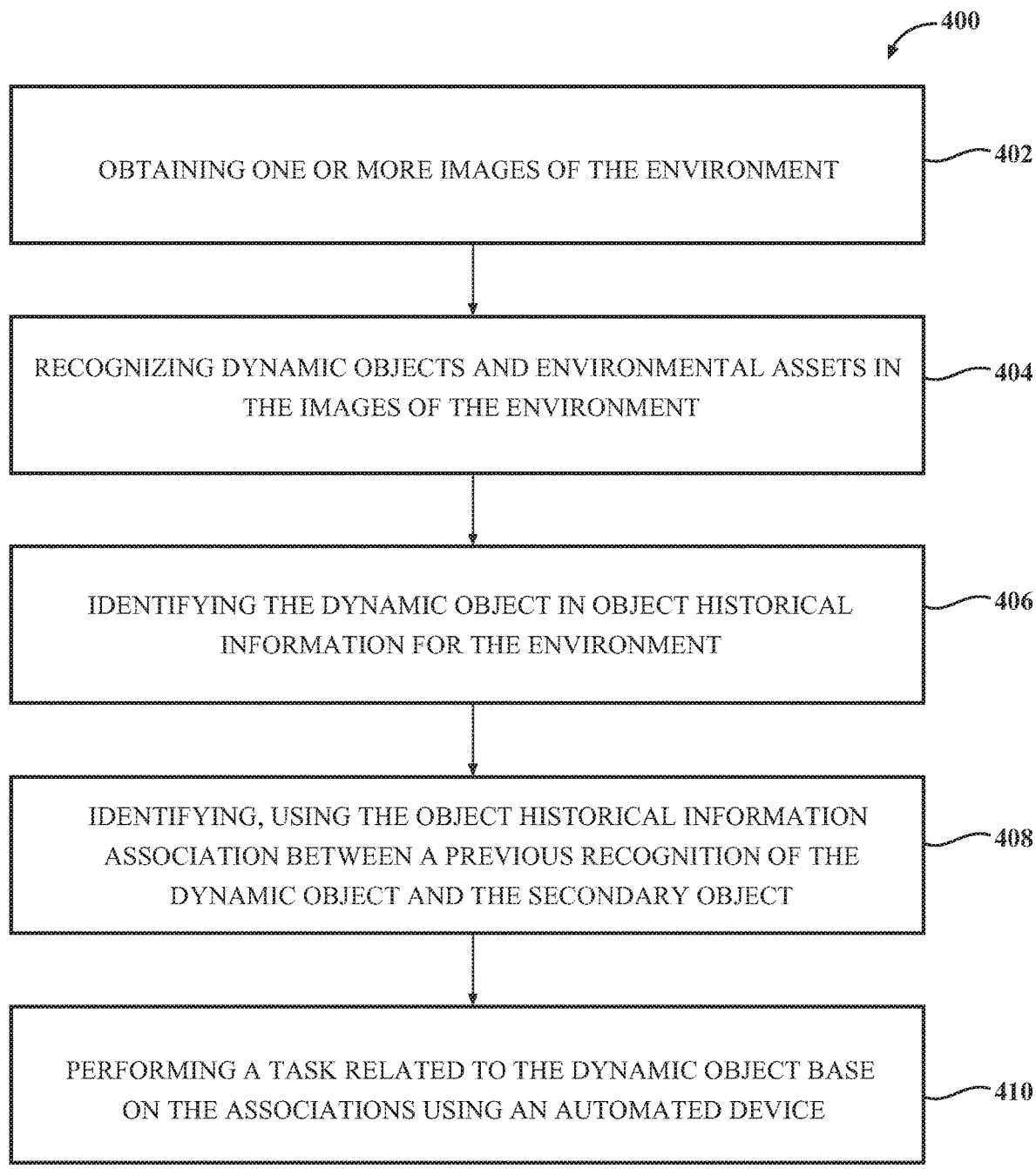
FIG. 4 is a flow diagram of a method for recognizing and associating dynamic objects in an environment, according to one embodiment.

FIG. 4 depicts a method 400 for associating a dynamic object with one or more secondary objects. Upon entering the environment, the dynamic object is recognized and associated with related secondary objects and historical data particular to the dynamic object. In this way, further data can be collected and associated with the dynamic object. The method 400 includes obtaining, using at least one image capture device, one or more images of the environment, at 402. At least one dynamic object and one or more environmental assets can be recognized in the one or more images of the environment, at 404. The at least one dynamic object can be identified in a database of object historical information for the environment, at 406. Using the database of object historical information, one or more associations can then be identified between the at least one previous recognition of the at least one dynamic object and the at least one secondary object, at 408. A task related to the at least one dynamic object can then be performed, based on the one or more associations, using an automated device, at 410. The associations described here can create association data which provides further information about the dynamic object.

The method 400 includes obtaining, using at least one image capture device, one or more images of the environment, at 402. The image capture device can be a camera, a video recording device or other device that can be used to collect one or more images. The image capture device can be part of a system, such as the association system 126 described with reference to FIGS. 1 and 2. The one or more images can be collected over a period of time. In one example, the one or more images are collected at specific time intervals over a period of time, such as during the period of time the system or device is operating. Further, the images can be collected in response to an initiation event, such as the activation of a motion detector. The image capture device can collect images of the environment generally or focused on the initiation event (e.g., the dynamic object).

The method 400 can further include reducing the images obtained, in light of inventory information. The method 400 can use a previously acquired inventory from the inventory information 270 for the environment or the inventory can be acquired during the monitoring, using the object recognition module 220. The environment is defined as the field of view for the camera. The field of view includes static objects, dynamic objects and enclosures. The field of view includes visibility restricted static and dynamic objects, objects, such as obstructed objects, partially obstructed objects, reasonably anticipated objects (e.g., two walls appear to be converging, so a corner is a reasonably anticipated object even if outside of the field of view), and others. In one example, the environment can be a room, such as a living room. This inventory can be gathered as part of the method 400 (e.g., collecting the information about the environment when the method 400 is implemented), or it can be produced prior to implementing the method 400. The inventory contains numerous pieces of information regarding the static objects in the environment and previous instances of dynamic objects.

At least one dynamic object and one or more environmental assets can be recognized in the one or more images of the environment, at 404. As the dynamic object enters the environment, the dynamic object is detected using object recognition creating recognition data about the dynamic object. The object recognition can be performed by a device or system, such as by the instance association module 230 of the association system 170, described with reference to FIGS. 1 and 2. The recognition data can be substantially similar to the recognition data described with reference to FIG. 2. This information, including the information described above with relation to dynamic objects, can then be added to the dynamic object data set.

The at least one dynamic object can be identified in a database of object historical information for the environment, at 406. The object historical information can be substantially similar to the object historical information 260 from the database 210, described with reference to FIGS. 2-3. The object historical information can be preexisting, such as if the object has been in the environment before. The object historical information can be updated and/or modified as appropriate to reflect new information, corrected information, updated information or combinations thereof. In one example, the object historical information can be created to receive a new dynamic object data set, in the case of a new object in the environment. In another example, the object historical information can be created or updated using the dynamic object data set, as well as readily available data stored locally or remotely about the dynamic object.

The dynamic object data set can include the recognition data, the instance data, the association data, or combinations thereof. Generally speaking, the dynamic object data set is an accumulation of all of the recognition, analysis and associations made up to this point during a specific instance of detection, identification and association. The dynamic object data set can be stored in memory, such as memory 114. As well, the dynamic object data set can be stored in a computing device, such as the computing device 100 described with reference to FIG. 1. The dynamic object data set can be added to the object historical information 260 once the association is complete, described above related to the association system 126 with reference to FIG. 2. The computing device can be network connected, such that one or more local or remote computing devices can receive the dynamic object data set.

The recognition data can then be monitored for known dynamic objects using the object historical information, the monitoring creating instance data. If the dynamic object has been in an environment before, the previously gained information regarding the dynamic object will also be associated. This historical data, which can be stored in the object historical information, can include previous entries into the environment, associations with previous secondary objects, previous poses in this or other environments, and connections between previous secondary objects and current objects. Following the above example, the boots will have been associated with the woman. Here we assume, for the sake of example, the boots have been in the environment two previous times. The previous entries of the boots into the environment are then associated with the boots, including all data point listed above (temporal information, color, the secondary associations, etc.).

Of note, the dynamic object (e.g., the boots) is the central item in this association. As such, all previous associations with secondary items will be important to the boots. If, in the example above, the woman (e.g., the first woman) loaned his/her boots to another person (e.g., a second woman), then that association would be recorded in the dynamic object data set and associated with the boots upon entry into the environment. As noted above, multiple dynamic objects can enter an environment at once. All dynamic objects in the environment can be detected and handled in the same manner as described in methods and systems disclosed herein. The dynamic objects can be analyzed sequentially, simultaneously or in other temporal manners, as desired.

Using the database of object historical information, one or more associations can then be identified between the at least one previous recognition of the at least one dynamic object and the at least one secondary object, at 408. Data on all other environmental assets, including other dynamic objects and static objects in the environment, has been collected during this time as well. Using this information, information regarding a previous recognition of the at least one dynamic object and the at least one secondary object, from the object historical information, can be associated to the dynamic object using the instance data. Thus, any other dynamic object or static object can become a secondary object for the purposes of the methods described herein. The association between the secondary object and the dynamic object can include ownership of or ownership by the dynamic object, type of connection between the secondary object and the dynamic object (e.g., the person is wearing the boots, the controller and the game console work as a unit, etc.). Further, the association can include the temporal relationship between the dynamic object and the secondary object (e.g., the boots entered the environment with the person at 19:49) and the circumstances of use (e.g., these boots were used as part of a suit). As well, the association data can include other factors which describe or clarify the association between the dynamic object and the secondary object.

A task related to the at least one dynamic object can then be performed, based on the one or more associations, using an automated device, at 410. The automated device can be any device capable of having one or more functions automated, such as a household appliance having one or more embedded systems, an autonomous or semi-autonomous robot, an autonomous vehicle, or others. The dynamic object data set, the object historical information, or combinations thereof can be communicated from a computing device to an automated device through a variety of connections (either wired or wireless). Exemplary connections include Wi-Fi (any wireless protocol), Bluetooth, and Ethernet cable. The dynamic object data set can be transmitted on request from the autonomous robot, by initialized upload from computing device or by constant feed from the computing device. The dynamic object data set can then be processed and/or utilized by the autonomous robot to perform a specific task (e.g., move boots from a starting location to their proper owner's storage location). In a further embodiment, the dynamic object data set is incorporated into the object historical information prior to being forwarded to the automated device.

The method can further include obfuscating personally identifiable information. Information can be collected that would make it possible for someone viewing or receiving the information to determine the exact person the information relates to. In one embodiment, that information can be reduced or obfuscated such that it is no longer personally identifiable. For example, a person is associated with a car where the license plate is known. In this case, the associations can be collected in the association data and then the license plate can then be converted to an internally recognizable number.

The associations herein can provide invaluable local information about the dynamic object. Such information includes who owns the dynamic object, where it is, the useful life remaining, etc. This information can be shared with and utilized by an end user or by an automated device (e.g., autonomous robot). Further, this information, collected over a long period of time, can provide interesting and useful parameters to a household or a company (e.g., what products are actually used when purchased, subconscious behaviors regarding the dynamic objects, etc.).

Embodiments described herein allow for quick association of data regarding a target dynamic object. By associating a dynamic object with secondary objects in an environment, further information can be gathered about the dynamic object which is not available when considering the dynamic object alone. Further, gather object historical information enhanced the association benefit, as information on all objects can be associated over a period of time. Such a method can be useful in monitoring systems or alarm systems, where short processing times and proper recognition of a target dynamic object is the desired goal, rather than gathering large quantities of data on all possible dynamic objects.

Other and further embodiments of the systems and methods described above are contemplated, including combinations of or deletions from said systems and methods, without specific recitation thereof. In a further embodiment, the object historical information includes information about a temporal connection between the at least one dynamic object and the at least one secondary object. In a further embodiment, the one or more associations include at least one of temporal data regarding the at least one dynamic object, temporal data regarding the at least one secondary object, and connection data regarding the association between the at least one dynamic object and the at least one secondary object. In a further embodiment, the association module further includes instructions to use object historical information as part of training the association module. In a further embodiment, the at least one secondary object is another dynamic object. In a further embodiment, the instance identification module further comprises instructions to use the object historical information to minimize redundant data collection about the at least one dynamic object. In a further embodiment, the one or more environmental assets further comprise static objects, and wherein the object historical information further comprises association data between the static objects and the at least one dynamic object. In a further embodiment, the object historical information comprises information about a locality connection between the at least one dynamic object and the at least one secondary object.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. An association system for historically relating objects, comprising:
    one or more processors; and
    a memory communicably coupled to the one or more processors and storing:
        an object recognition module including instructions that when executed by the one or more processors cause the one or more processors to obtain, using at least one image capture device, one or more images of an environment, and to recognize at least one dynamic object and one or more environmental assets in the one or more images of the environment, the one or more environmental assets including at least one secondary object, and to recognize pose information about at least one of the at least one dynamic object and the at least one secondary object;
        an instance identification module including instructions that when executed by the one or more processors cause the one or more processors to identify the at least one dynamic object in a database of object historical information for the environment, the object historical information comprising at least one previous recognition of the at least one dynamic object, the object historical information comprising pose information of at least one of the at least one dynamic object and the at least one secondary object during at least one previous recognition; and
        an association module including instructions that when executed by the one or more processors cause the one or more processors to identify, using the database of object historical information, one or more associations between the at least one previous recognition of the at least one dynamic object and the at least one secondary object, the one or more associations including ownership of or by the at least one dynamic object based on at least one of current pose information and previous pose information of at least one of the at least one dynamic object and the at least one secondary object, and to cause an automated device to perform a task related to the at least one dynamic object based on the one or more associations, the automated device being one of: a household appliance, an autonomous robot, a semi-autonomous robot, or an autonomous vehicle.

2. The association system of claim 1, wherein the object historical information comprises information for a temporal connection between the at least one dynamic object and the at least one secondary object.

3. The association system of claim 1, wherein the one or more associations comprise at least one of temporal data regarding the at least one dynamic object, temporal data regarding the at least one secondary object, and connection data regarding the association between the at least one dynamic object and the at least one secondary object.

4. The association system of claim 1, wherein the association module further comprises instructions to use object historical information as part of training the association module.

5. The association system of claim 1, wherein the at least one secondary object is another dynamic object.

6. The association system of claim 1, wherein the instance identification module further comprises instructions to:
cause the object historical information to be updated based on data in the one or images of the environment.

7. The association system of claim 1, wherein the one or more environmental assets further comprise static objects, and wherein the object historical information further comprises association data between the static objects and the at least one dynamic object.

8. The association system of claim 1, wherein the object historical information comprises information for a locality connection between the at least one dynamic object and the at least one secondary object.

9. A non-transitory computer-readable medium for historically relating objects and storing instructions that when executed by one or more processors cause the one or more processors to:
obtain, using at least one image capture device, one or more images of an environment;
recognize at least one dynamic object and one or more environmental assets in the one or more images of the environment, the one or more environmental assets including at least one secondary object;
recognize pose information about at least one of the at least one dynamic object and the at least one secondary object;
identify the at least one dynamic object in a database of object historical information for the environment, the object historical information comprising at least one previous recognition of the at least one dynamic object, the object historical information comprising pose information of at least one of the at least one dynamic object and the at least one secondary object during at least one previous recognition;
identify, using the database of object historical information, one or more associations between the at least one previous recognition of the at least one dynamic object and the at least one secondary object, the one or more associations including ownership of or by the at least one dynamic object based on at least one of current pose information and previous pose information of at least one of the at least one dynamic object and the at least one secondary object; and
cause an automated device to perform a task related to the at least one dynamic object based on the one or more associations, the automated device being one of: a household appliance, an autonomous robot, a semi-autonomous robot, or an autonomous vehicle.

10. The non-transitory computer-readable medium of claim 9, wherein the object historical information comprises information for a temporal connection between the at least one dynamic object and the at least one secondary object.

11. The non-transitory computer-readable medium of claim 9, wherein the object historical information comprises information for a locality connection between the at least one dynamic object and the at least one secondary object.

12. The non-transitory computer-readable medium of claim 9, wherein the one or more associations comprise at least one of temporal data regarding the at least one dynamic object, temporal data regarding the at least one secondary object, and connection data regarding the association between the at least one dynamic object and the at least one secondary object.

13. The non-transitory computer-readable medium of claim 9, further comprising instructions to:
cause the object historical information to be updated based on data in the one or images of the environment.

14. The non-transitory computer-readable medium of claim 9, wherein the one or more environmental assets further comprise static objects, and wherein the object historical information further comprises association data between the static objects and the at least one dynamic object.

15. A method for historically relating objects, comprising:
obtaining, using at least one image capture device, one or more images of an environment;
recognizing at least one dynamic object and one or more environmental assets in the one or more images of the environment, the one or more environmental assets including at least one secondary object;
recognizing pose information about at least one of the at least one dynamic object and the at least one secondary object;
identifying the at least one dynamic object in a database of object historical information for the environment, the object historical information including at least one previous recognition of the at least one dynamic object, the object historical information comprising pose information of at least one of the at least one dynamic object and the at least one secondary object during at least one previous recognition;
identifying, using the database of object historical information, one or more associations between the at least one previous recognition of the at least one dynamic object and the at least one secondary object, the one or more associations including ownership of or by the at least one dynamic object based on at least one of current pose information and previous pose information of at least one of the at least one dynamic object and the at least one secondary object; and
causing an automated device to perform a task related to the at least one dynamic object based on the one or more associations, the automated device being one of: a household appliance, an autonomous robot, a semi-autonomous robot, or an autonomous vehicle.

16. The method of claim 15, wherein the object historical information comprises information for a temporal connection between the at least one dynamic object and the at least one secondary object.

17. The method of claim 15, wherein the object historical information comprises information for a locality connection between the at least one dynamic object and the at least one secondary object.

18. The method of claim 15, wherein the one or more associations comprise at least one of temporal data regarding the at least one dynamic object, temporal data regarding the at least one secondary object, and connection data regarding the association between the at least one dynamic object and the at least one secondary object.

19. The method of claim 15, further comprising instructions to:
   cause the object historical information to be updated based on data in the one or images of the environment.

20. The method of claim 15, wherein the one or more environmental assets further comprise static objects, and wherein the object historical information further comprises association data between the static objects and the at least one dynamic object.

\* \* \* \* \*